March 18, 1969      W. O. WILSON      3,433,079

ROCKET CHAMBER LEAK TEST FIXTURE

Filed July 13, 1967      Sheet 1 of 2

*INVENTOR.*
WILLIAM O. WILSON

BY

ATTORNEYS

United States Patent Office 3,433,079
Patented Mar. 18, 1969

3,433,079
ROCKET CHAMBER LEAK TEST FIXTURE
William O. Wilson, Lancaster, Calif., assignor to the United States of America as represented by the Administrator of the National Aeronautics and Space Administration
Filed July 13, 1967, Ser. No. 653,278
U.S. Cl. 73—49.8                    7 Claims
Int. Cl. G01m 3/04

ABSTRACT OF THE DISCLOSURE

In order to test a rocket chamber for leaks, in accordance with this invention, a fixture is provided which fastens to the nozzle of the rocket chamber and inserts a tubular plug in the tapering throat section thereof. The tubular plug carries a tube which enables access to the interior of the rocket chamber.

Origin of the invention

The invention described herein was made by an employee of the United States Government and may be manufactured and used by or for the Government for governmental purposes without the payment of any royalties thereon or therefor.

Background of the invention

A rocket chamber leak test fixture is a device for enabling the pressurization of a rocket motor chamber and the associated propellent tubing to detect the presence of leaks in the system as well as the proper functioning of pressure-sensitive transducer elements used to monitor critical rocket motor operating parameters.

The general type of fixture which has been used heretofore comprises two plates. One of these plates has an opening large enough to fit over the flared end or nozzle of the rocket chamber. A resilient collar is fitted over the outside of the flared end and the inside wall of the plate to prevent the plate from being pulled off of the flared end. A second circular plate has a central opening into which a tubular member is fitted. The end of the tubular member is adapted to push a resilient collar into the inside opening of the flared end of the rocket chamber. The second plate has bolt holes spaced around its periphery with bolts extending therethrough. The ends of the bolts which were opposite the first plate were threaded and were adapted to threadably engaged threaded slots correspondingly positioned around the periphery of the first plate.

Accordingly, by turning the bolts, the second plate would be drawn toward the first plate thereby pushing the resilient plug tighter and tighter into the opening in the flared end of the rocket chamber.

Besides requiring a considerable amount of time to assemble and disassemble the prior art rocket chamber leak test fixture, for checking a rocket chamber and system for leaks, because of the manner in which the collar bears on the nozzle flared portion when the bolts are turned to tighten up the fixture, a crushing load is applied to the least structurally sound portion of the rocket chamber. This, on some occasions, causes crushing failure of the flared nozzle portion.

An object of this invention is to provide a rocket chamber test fixture which is very rapidly attached to and removed from a rocket chamber.

Another object of the present invention is to provide a simple rocket chamber leak test fixture which does not require disassembling and assembling for the purposes of being used.

Still another object of the present invention is to provide a novel and simple rocket chamber leak test fixture.

Summary of the invention

The present invention comprises a cross head member adapted to centrally mount a hollow tubular plug member. A handle is pivotally mounted at each end of the cross head member. Each handle has a raised portion which acts as a stop to prevent rotation of the handle beyond a predetermined position when moving toward each other. Pivotally mounted on each handle is a hook arm which has a long shank terminating in an inwardly facing hook. The hook arms are pivotally suspended above and eccentrically from the handle pivotal suspension on the cross head. In operation, the hook arms are slipped over a rim, which is formed on a rocket chamber head, and the tubular plug member is slidably positioned on the cross head member to be insertable into the opening in the flared portion of the rocket motor exhaust. The movement of the handles toward each other moves the cross head member toward the chamber head and urges the plug to forcibly seat in the restricted portion of the nozzle. The pressure seal thus formed permits test pressure to be introduced to the chamber either when the plug member is connected to a pressure reading instrument or when the member is capped off.

Description of the preferred embodiment

Figure 1:
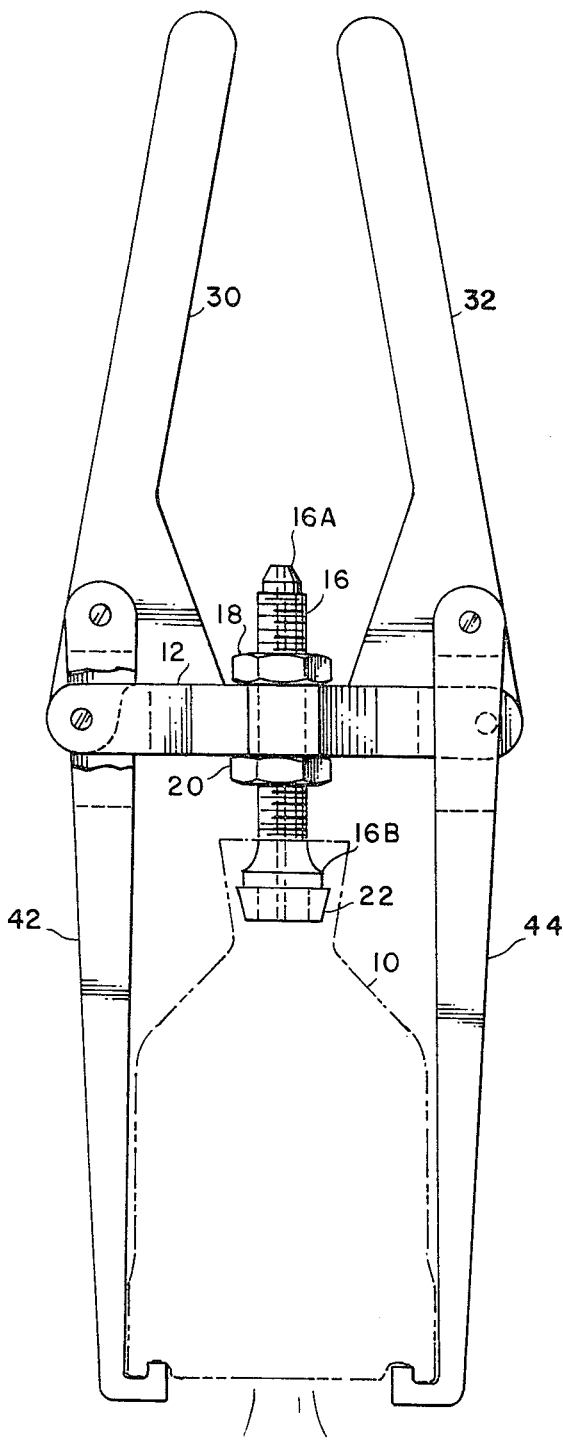
FIGURE 1 is an assembly drawing of an embodiment of the invention.
Figure 2:
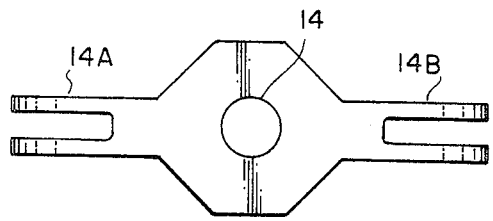
FIGURES 2 and 3 are respectively plan and elevation views of the cross head member.
Figure 3:

Referring now to FIGURE 1 of drawings, which comprises an assembly of a preferred arrangement of an embodiment of this invention, a typical rocket nozzle chamber 10 is represented by the dashed line. A cross head member 12, the details of which are shown in FIGURES 2 and 3, has a central opening 14, as shown in FIGURE 2, through which there extends a tubular member 16. A pair of spaced centering nuts, 18, 20, support the tubular member 16. The top end 16A of the tubular member is terminated in a manner to enable its attachment to either a pressure indicating meter, or to be capped. The bottom end 16B of the tubular member is flared and is fitted with a plug 22, which is made of resilient material, and which engages the throat of the rocket nozzle.

As may be seen in FIGURES 2 and 3, the cross head member has forked terminations respectively 14A and 14B at its two ends. Mounting holes respectively 24, 26, are provided through the forked ends.

Figures 4, 5:
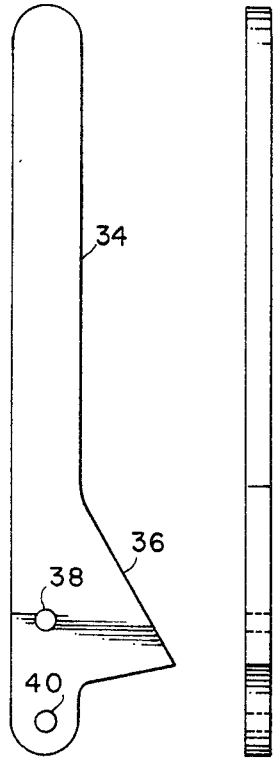
FIGURES 4 and 5 are respectively side and end views of the handles.

Two handles, respectively 30, 32, are pivotally mounted in the forked ends of the cross head member. As shown in FIGURES 4 and 5, each handle has an arm portion 34, which terminates in raised portions 36, which operate to prevent too far an inward travel of the handles. Also, at the raised portion end of the handles, there are provided two holes, respectively 38, 40. The handles are pivotally mounted by the holes 40.

Figures 6, 7:
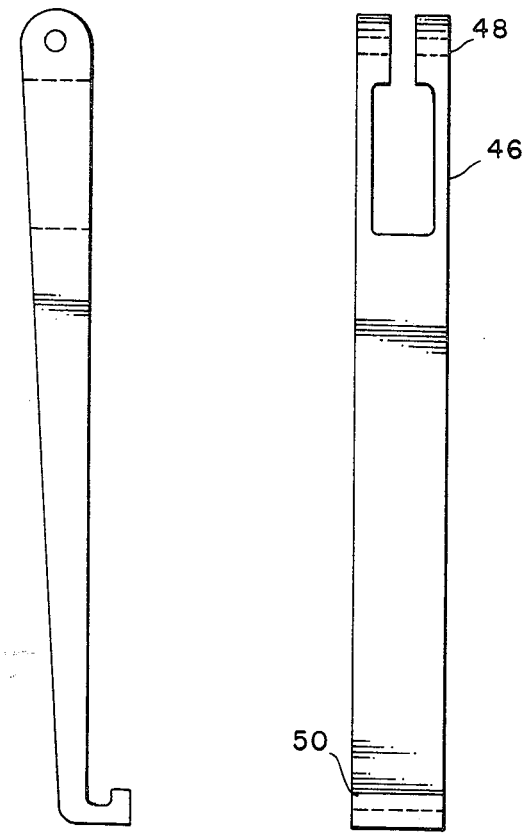
FIGURES 6 and 7 are respectively side and end views of the attaching arms.

Pivotally attached to the holes 38 are a pair of hook members 42, 44. As may be seen in FIGURES 6 and 7, one end 46 of a hook member is terminated as a fork having a hole 48 therethrough. The other end 50 terminates in a hook.

In operative use, the tubular plug member is inserted in the tapering throat section of a typical rocket nozzle 10. The handles are rotated outwardly, permitting the hook ends of the hook members to engage a flanged portion of said rocket chamber propellent injection dome. When the hook members are thus engaged, the handles are rotated inwardly which foreshortens the spacing between the hook ends and the cross head member, which urges the tubular plug member into a sealed, wedging engagement with the rocket nozzle tapered throat section. The tubular plug member is preferably provided with a resilient gasket material for improved sealing characteristics of the plug end and for prevention of scoring or alling of the rocket nozzle throat surface. The inwardly disposed raised portions of the handle members prevent rotation of the handles beyond a maximum "over center" eccentric relationship with the arm pivot point and the handle pivot point on the cross head member. The "over center" eccentricity of the arm pivot point and the handle pivot point effectively locks the tubular plug in engagement with the rocket nozzle throat section.

By actual test, it was found that the prior art rocket chamber leak test fixture takes at least six times as long to install as this invention. Also, this invention does not require assembly or disassembly of parts for installation or for removal.

Accordingly, there has been described and shown herein a novel, useful and simple rocket chamber leak test fixture.

I claim:

1. A fixture for affording the testing for leaks of a rocket chamber of the type having an opening at one end and a flange at a location along said chamber which is spaced from said one end, said fixture comprising tubular plug means for insertion into said rocket chamber opening;
    cross head member means for supporting said tubular plug means inserted in said opening;
    moveable handle means pivotably supported on said cross head member means;
    hook member means pivotally supported at one end from said handle means at a distance from said handle means pivotal support on said cross head member means, said hook member means engaging with its other end said flange in said chamber whereby upon pivotal motion of said handle means pressure is applied to said cross head member and said plug for urging said plug into said rocket chamber opening with movement of said handle means toward each other.

2. A test fixture as recited in claim 1 wherein said cross head member means comprises an elongated member having two end portions and a center portion;
    said center portion having an opening therethrough for affording attachment to said tubular plug member;
    said end portions each terminating in a fork-like structure each having an opening therethrough for affording pivotal attachment thereto of said handles.

3. Apparatus as recited in claim 2 wherein each of said moveable handle means includes an elongated arm portion having an opening at one end for affording pivotal attachment to the forked end of said cross head member;
    a second opening spaced from the first opening in said handle member in a direction towards the other end of said handle member; and
    a raised portion of said handle member extending outwardly from said handle member adjacent the location of said second opening, for engaging said cross head member for preventing rotation of said handles toward one another beyond a predetermined position.

4. Apparatus as recited in claim 3 wherein each said hook member means includes an elongated member terminating at said other end in means for engaging said flange, and terminating at said one end in a fork structure having an opening therethrough for affording pivotal connection to the second opening of a handle meas.

5. A rocket chamber leak test fixture comprising a cross head member having a central opening therein;
    a plug member;
    means for supporting said plug member from the central opening of said cross head member;
    a pair of handles, means for pivotally attaching each of said pair of handles to an end of said cross head member, each said handle having means for pivotally engaging said cross head member for preventing rotation of said handles beyond a predetermined point towards one another; and
    a pair of elongated rocket chamber engaging members, each having means at one end for removeably attaching each said rocket chamber engaging member to said rocket chamber, and at the other end, means for pivotally attaching to a handle at a location to one side of the attachment of the handle to said cross head member for producing reciprocal motion of said attaching members with rotational motion of said handles.

6. A rocket chamber leak test fixture as recited in claim 5 wherein said means at said one end of each of said pairs of elongated rocket chamber engaging members is a hook for engaging said rocket chamber.

7. A rocket chamber leak test fixture as recited in claim 5 wherein said plug member comprises a hollow cylindrical member having a resilient collar at one end for insertion into a rocket chamber opening, said means for supporting said plug member from the central opening of said cross head member includes a pair of nuts positioned on either side of said cross head member and threadably engaging said plug member.

References Cited

UNITED STATES PATENTS

| | | | |
|---|---|---|---|
| 431,939 | 7/1890 | Fallon | 138—90 |
| 971,191 | 9/1910 | Gray | 73—49.8 |
| 1,174,055 | 3/1916 | Carlson | 138—90 |
| 1,671,935 | 5/1928 | Price | 73—49.8 |
| 3,163,035 | 12/1964 | Kinzie et al. | 73—49.8 |

FOREIGN PATENTS 146,481   8/1962   Russia.

LOUIS R. PRINCE, *Primary Examiner.*

J. NOLTON, *Assistant Examiner.*

U.S. Cl. X.R.

138—90; 335—202